United States Patent [19]

Härdig et al.

[11] Patent Number: 5,647,301
[45] Date of Patent: Jul. 15, 1997

[54] METHOD FOR PLANTING FISH EGGS AND A PLANTING TUBE FOR CARRYING OUT THE METHOD

[76] Inventors: Lars Härdig, Fjärde Tvärgatan 47, Gävle S-802 82; Lars Norman, Mästargatan 3 B, Sandviken S-811 61, both of Sweden

[21] Appl. No.: 507,271
[22] PCT Filed: Apr. 13, 1993
[86] PCT No.: PCT/SE93/00316
 § 371 Date: Aug. 21, 1995
 § 102(e) Date: Aug. 21, 1995
[87] PCT Pub. No.: WO94/23568
 PCT Pub. Date: Oct. 27, 1994
[51] Int. Cl.⁶ .................................................. A01K 61/00
[52] U.S. Cl. ........................................................ 119/217
[58] Field of Search ........................ 119/217, 215, 119/218, 223; 222/175, 92, 95, 96, 97, 98, 106; 604/115, 187, 218

[56] References Cited

U.S. PATENT DOCUMENTS

| | | |
|---|---|---|
| 1,008,018 | 11/1911 | Crittenden ................. 604/218 |
| 2,443,861 | 6/1948 | Johnston . |
| 3,550,542 | 12/1970 | Hollis ........................ 111/95 |
| 4,130,086 | 12/1978 | Jones ......................... 119/217 |
| 4,178,878 | 12/1979 | Jones ......................... 119/217 |
| 4,226,335 | 10/1980 | Sowards ..................... 221/185 |
| 5,170,729 | 12/1992 | Benner ....................... 111/95 X |
| 5,339,994 | 8/1994 | Nuila ......................... 111/95 |

*Primary Examiner*—Robert P. Swiatek
*Assistant Examiner*—Yvonne R. Abbott
*Attorney, Agent, or Firm*—Zarley, McKee, Thomte, Voorhees & Sease

[57] ABSTRACT

15 Claims, 2 Drawing Sheets

METHOD FOR PLANTING FISH EGGS AND A PLANTING TUBE FOR CARRYING OUT THE METHOD

THE FIELD OF THE INVENTION

Several of the fish species that are most valuable from a fish breeding point of view, especially salmon fishes, lay, under natural circumstances, their eggs in pits on the gravel bottom in streaming waters. The forming and covering of the pits is done with a behaviour determined by the instincts of the fish and has been difficult to imitate for humans, but is necessary for the eggs to be hatched. During the planting of fish one has therefore been obliged to plant fries that are cultivated in pools to a certain size. This leads to large costs as well as the risk of spreading diseases. The planting of eggs, on the other hand, has the advantage that the young fishes will seek a natural territory.

The object of the present invention is a method for planting fish eggs and a planting tube for carrying out the method.

PRIOR ART

The planting of eggs is today for instance carried out by placing the eggs in steel wire cages filled with stones or in perforated plastic boxes which are dug down or placed in cavities in the bottom. This is work requiring, especially during winter and spring, and eggs in the stage of development which is most suitable for the handling in plastic boxes are sensitive to infections.

Therefore it would be desirable to develop a method for planting fish eggs, which method can be employed at all seasons of the year, which can easily be adapted to the local conditions and which gives good hatching results.

Further art known in the context appears in U.S. Pat. No. 4,130,086. There, a planting tube for fish eggs is described, which tube is adapted to be pressed down with its point into the bottom material of a watercourse or a sea. The point of the planting tube has an orifice hole formed through oblique cutting of the lowermost portion of the tube. Furthermore, the planting tube comprises an upper part for receiving fish eggs and a first valve arranged below the upper part. By opening the valve fish eggs can thus be affected to flow from the upper part down through the tube and out through the orifice hole.

However, the planting tube according to the US-patent has several drawbacks. One of these drawbacks is that the egg grains will be subjected to relatively rough treatment as they, from the valve, which is placed in a relatively high position, fall down towards the orifice of the planting tube. A further drawback with the planting tube according to the US-patent is that the one and only orifice hole at the lower end of said tube will give rise to a local gathering of eggs just outside the orifice hole. Such local egg gatherings have proved themselves to involve a very large risk for fungus attacks, which can destroy the eggs at the planting place in question.

THE OBJECT OF THE INVENTION

The object of the present invention is to further develop the egg planting technique being related to so that the above-mentioned drawbacks are reduced.

As to the characteristics defined in patent claims 1 and 5 a substantially more lenient treatment of the fish eggs is obtained because of the existence of the upper and lower valves and the container-like intermediate part of the planting tube present between said valves.

As to the characteristics of the planting tube defined in patent claim 10, by means of the plurality of outwards directed orifice holes of the point of the planting tube, it is obtained that the fish eggs will be spread effectively radially outwards from the point so that a good distribution of the fish eggs in the surrounding is obtained. Thereby, the risk for fungus attacks and the like is substantially reduced.

Further advantageous characteristics of the invention are defined in the dependent claims.

BRIEF DESCRIPTION OF THE DRAWINGS

With reference to the enclosed drawings a closer description of an embodiment of the invention, stated by way of example, will follow below.

On the drawings.

DETAILED DESCRIPTION OF A PREFERRED EMBODIMENT

Figures 1, 2:
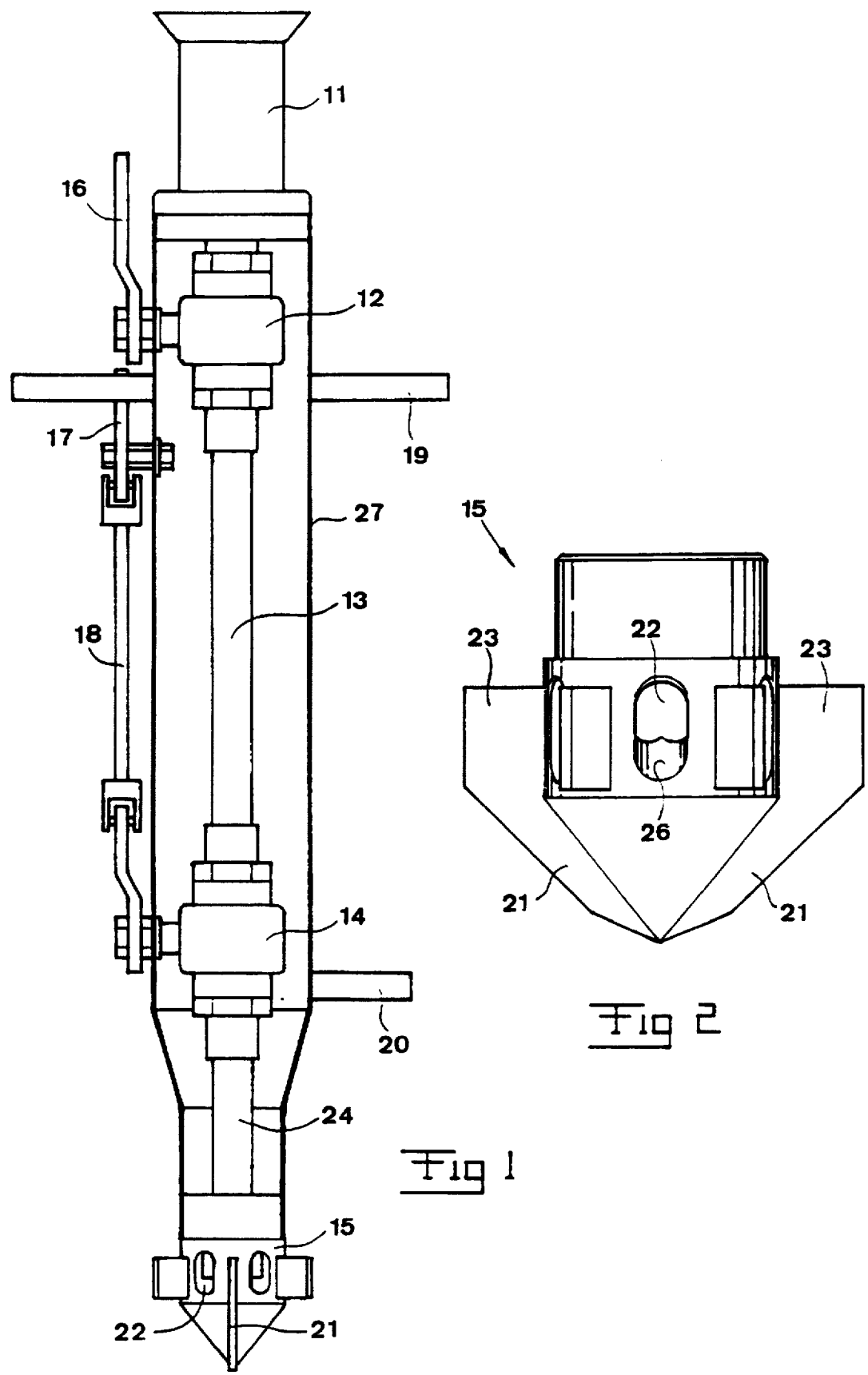
FIG. 1 is a partially sectioned view of the planting tube.
FIG. 2 is an enlarged detail view of the point part of the planting tube, seen from the left (alternatively the right) in FIG. 1.

During application of the invention fish eggs are intended to be planted on bottoms which can be natural or formed to resemble the natural bottoms, which bottoms, for salmon fishes, are normally formed by gravel or small stones to a depth of at least 10 cm. in streaming water. By means of pressure and turning the planting tube according to the invention is pressed into the gravel layer. After that, the fish eggs are allowed to stream out, together with an amount of water, through orifice holes in the point of the planting tube, the egg grains being spread within the gravel layer, where they are protected from being washed away and from being eaten up.

The planting tube comprises a measuring tube 11, an upper valve 12, a container 13, a lower valve 14 and a point 15.

The valves 12, 14 are operated by means of two arms 16, 17, the arm 17, which operates the lower valve 14, being connected to this valve via a draw bar 18. The purpose of this is that the arm 17 is to be located above the valve 14 and above the normal water level surrounding the planting tube during the planting operation. Instead of the described and illustrated arms 16, 17 arbitrary other operation members for the valves 12, 14 can of course be considered.

The planting tube also comprises a handle 19 for lifting, directing and turning the tube and one or more foot supports 20 for depressing. In certain embodiments also a pump, fixed to the planting tube, or a floating member can be comprised.

The point 15 of the planting tube is in the lower part provided with bore cutters 21 and above the latters there is a plurality of outwards directed orifice holes 22 which are in connection with the lower valve 14 via an intermediate tube section 24.

To obtain a distribution of the egg grains outwards from the point 15 over the largest possible bottom region the orifice holes 22 are directed outwards from the point 15 in different directions. Thereby it is preferred that the orifice holes 22 are distributed around the periphery of the point 15. In practise the orifice holes 22 should be at least three and preferably more as to their number. Very good distribution results have been achieved with a point embodiment comprising six orifice holes 22.

Wings or other projections 23 projecting from the point 15 are, advantageously, arranged between adjacent orifice holes 22. These are adapted to guide the stream of eggs in a direction radially outwards from the point 15. The wings or projections 23 also have an advantageous bottom hole boring effect as the planting tube is pressed down into the bottom.

It is preferred that the wings or projections 23 have the character of disc-like portions oriented substantially parallel with the lengthwise axis of the planting tube.

Figure 3:
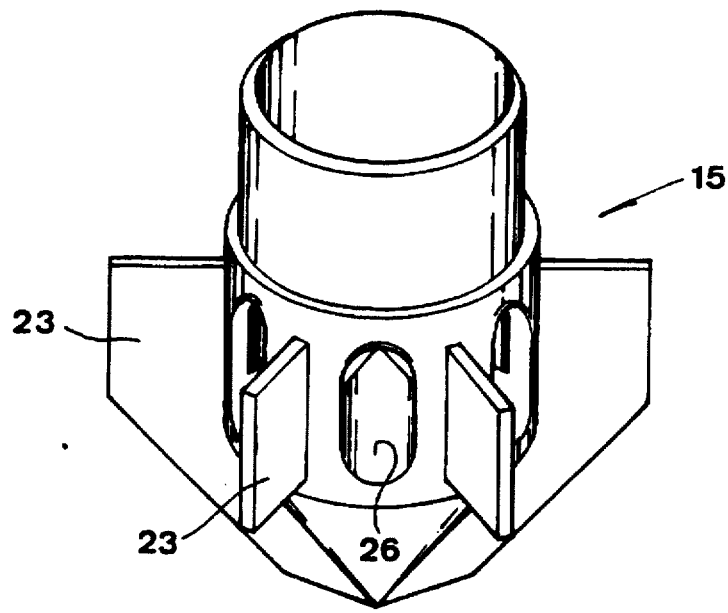
FIG. 3 is a perspective view of the point part, seen obliquely from above.

As particularly can be seen in FIGS. 2 and 3 the bore cutters 21 and at least some of the wings or projections 23 can form parts of the same, fin shaped member.

It is preferred that the point 15 has a conical or in another way downwards narrowing, lower end region and that the orifice holes 22 are arranged in a portion of the point which is located above this narrowing region. The portion including the orifice holes 22 can, thereby, be generally cylindrical or, in case of a downwards narrowing shape, downwards narrowing in a smaller degree than is the case for the lower outer region of the point.

Figure 4:
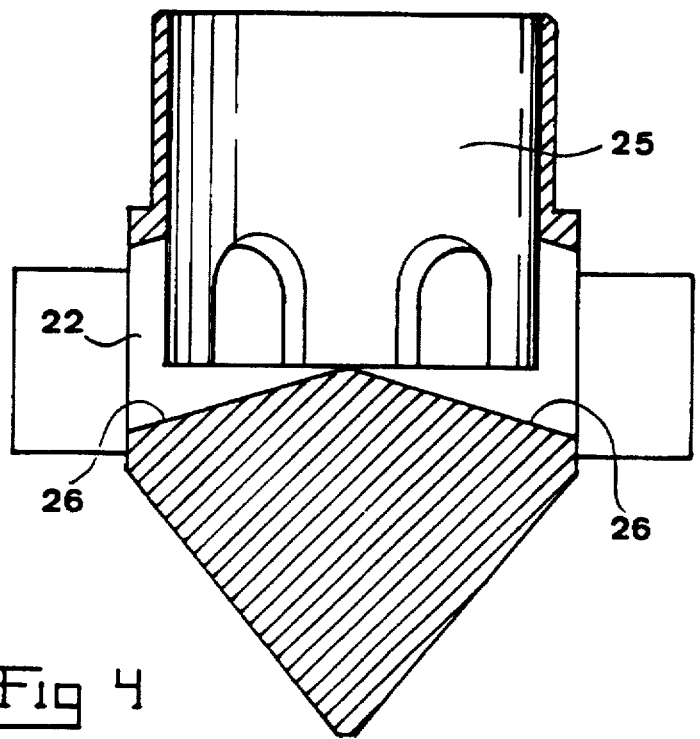
FIG. 4 is a vertical cross-section through the point part of the planting tube in a plane perpendicular to the drawing plane of FIG. 2.

The point 15 has an inner cavity 25 (FIG. 4) which communicates with the tube portion 24 between the point 15 and the lower valve 14. The orifice holes 22 are inclining obliquely downwards/outwards from the cavity 25. Thereby, at least the limiting surfaces 26 of the orifice holes 22 are to have an inclination downwards/outwards from the centre of the point. Thus the discharging of water/egg grains from the point will be directed obliquely downwards/outwards.

During planting of fish eggs with the planting tube one sets the latter with the point 15 against the bottom and presses it downwards with the foot support 20 while turning by means of the handle 19. The point 15 will then bore itself down into the gravel layer of the bottom by means of the bore cutter 21, while the projecting wings or portions 23 disintegrate the gravel and prevent gravel grains from penetrating into the orifice holes 22. During boring the lower valve 14 is to be closed to prevent gravel from penetrating into the container 13. After that, the container 13 is filled from above with water, so that the water level is higher than outside the planting tube. This can be done with a scoop or with a pump fixed to the planting tube. The upper valve 12 is shut and the required amount of fish eggs is filled into the transparent measuring tube 11. The upper valve 12 is once again opened, whereby the fish eggs sink down towards the lower end of the container 13. After a few seconds of waiting the lower valve 14 is opened, whereby the fish eggs followed by the water in the container 13, flows out into the gravel layer. As the fish eggs come first with a low speed the risk for damages on the fish eggs is small, and as the orifice holes 22 incline downwards neither fish eggs nor gravel remain positioned in the orifice holes.

During the discharge of the container 13, i.e. after that the valve 14 has been opened, a controlled discharge of fish eggs and water from the planting tube can be obtained through regulation of the valve 12.

The operating of the lower valve 14 can, by means of the arm 17, take place at a suitable height above the water or ice level, also when the depth of water is large or when the planting takes place in winter time through ice.

Advantageously the valves 12, 14 and the container 13 can be surrounded by a protecting tube 27, which also can form a floating member to prevent from loosing the planting tube if the latter is dropped into the water. The protecting tube 27 can be arranged with a hood which protects the draw bar 18 during transportation and during planting through ice.

The method and the planting tube according to the invention are not delimited by the showed embodiment exclusively. For operation at varying depths the planting tube can, for instance, be designed with telescopically variable length. For operation when the bottom can't be seen, e.g. through ice, the planting tube can be provided with a disc which hits the bottom when the point is down at a required depth. The method and the planting tube according to the invention can also be used for planting small fish fries.

We claim:

1. A method for planting fish eggs in watercourses or seas comprising the steps of:
   (a) providing a planting tube having a point (15), an intermediate part forming a container (13) between an upper valve (12) and a lower valve (14), a part (11) located above the upper valve (12), and at least one orifice hole (22) formed in the tube;
   (b) pressing the planting tube down with the point (15) into the bottom material of the watercourse or the sea,
   (c) filling the container (13) with water;
   (d) filling the part (11) of the tube with fish eggs;
   (e) opening the upper valve (12) to mix the fish eggs with the water in the container (13) of the tube; and
   (f) opening the lower valve (14) allowing the fish eggs to flow out through at least one orifice hole (22) in the point (15).

2. A method according to claim 1, characterized in that, during step (f), the outflow-rate is regulated by the upper valve (12).

3. A method according to claim 1, characterized in that, the amount of fish eggs during step (d) is measured by a graduation on a transparent part of the uppermost part (11) of the planting tube.

4. A method according to claim 1, characterized in that, the planting tube is pressed down into the bottom material of the watercourse under simultaneous turning.

5. A planting tube for fish eggs comprising a point (15) with at least one orifice hole (22), an upper part (11) for receiving fish eggs and a first valve (12) arranged below the upper part, characterized in that the planting tube has a second valve (14) below the first valve and that these two valves have a container-like intermediate part (13) of the tube between themselves, the second valve (14) being located between the container-like intermediate part (13) of the tube and the at least one orifice hole (22), wherein the second valve (14) has a first state cutting off the container-like intermediate part (13) of the tube from the at least one orifice hole (22) and a second state allowing communication between the container-like intermediate part (13) of the tube and the at least one orifice hole (22) to empty the fish eggs from the container-like intermediate part (13) of the tube past the second valve (14) and through the at least one orifice hole (22).

6. A planting tube according to claim 5, characterized in that the planting tube further comprises an arm (17) for controlling the operation of the second valve (14).

7. A planting tube according to claim 6 characterized in that its upper part (11) is designed as a graduated measuring tube.

8. A planting tube according to claim 5, characterized in that its upper part (11) is designed as a graduated measuring tube.

9. A planting tube according to claim 5, characterized in that the underside of the point has a bore cutter (21).

10. A planting tube according to claim 5, characterized in that its upper end is provided with a handle (19) for lifting and turning.

11. A planting tube for fish eggs comprising a point (15) with a plurality of orifice holes, and wings protruding from the point (15) and arranged between adjacent orifice holes, characterized in that the plurality of orifice holes (22) are arranged in the point and that the plurality of orifice holes are directed outwards from the point in different directions.

12. A planting tube according to claim 11, characterized in that the orifice holes are distributed around the periphery of the point.

13. A planting tube according to claim 12, characterized in that wings protruding from the point are arranged between adjacent orifice holes.

14. A planting tube according to claim 12, characterized in that the orifice holes incline obliquely downwards/outwards.

15. A planting tube according to claim 11, characterized in that the orifice holes incline obliquely downwards/outwards.

* * * * *